United States Patent [19]

Coggan et al.

[11] Patent Number: 4,579,767

[45] Date of Patent: Apr. 1, 1986

[54] SIMULATED CERAMIC TILE

[75] Inventors: William G. Coggan, Rochester, Mich.; Jared G. Cuddy, Toledo, Ohio; Frank W. Reason, Wilkesboro, N.C.

[73] Assignee: Abitibi-Price Corporation, Troy, Mich.

[21] Appl. No.: 709,044

[22] Filed: Mar. 7, 1985

Related U.S. Application Data

[63] Continuation of Ser. No. 527,695, Aug. 30, 1983, abandoned.

[51] Int. Cl.[4] .......... B32B 3/00; B32B 3/10

[52] U.S. Cl. .......... 428/161; 428/163; 428/165; 428/167; 428/171

[58] Field of Search .......... 428/161, 163, 165, 167, 428/171; 427/408, 325

[56] References Cited

U.S. PATENT DOCUMENTS

| | | | |
|---|---|---|---|
| Re. 17,654 | 4/1930 | Weber | 427/265 X |
| 1,657,159 | 1/1928 | Greenebaum | 428/492 X |
| 1,862,875 | 6/1932 | Weber | 427/265 X |
| 1,872,997 | 8/1932 | McCarthy | 427/264 X |
| 2,311,589 | 2/1943 | Feder | 427/264 |
| 2,432,747 | 12/1947 | Gilbert | 428/281 |
| 2,485,541 | 10/1949 | Schwarz | 427/265 X |
| 3,968,288 | 7/1976 | Trexler | 427/202 X |
| 4,112,189 | 9/1978 | Terwillinger | 427/265 X |
| 4,169,907 | 10/1979 | Barker et al. | 427/264 |
| 4,233,343 | 11/1980 | Barker et al. | 427/264 |
| 4,339,489 | 7/1982 | Barker et al. | 427/264 X |
| 4,393,108 | 7/1983 | Barker et al. | 427/264 X |

FOREIGN PATENT DOCUMENTS

| | | | |
|---|---|---|---|
| 0157327 | 12/1981 | Japan | 427/265 |
| 0123057 | 7/1982 | Japan | 427/265 |

*Primary Examiner*—George F. Lesmes
*Assistant Examiner*—Nancy A. B. Swisher
*Attorney, Agent, or Firm*—Barnes, Kisselle, Raisch, Choate, Whittemore & Hulbert

[57] ABSTRACT

A hardboard with an embossed and coated face to simulate ceramic tile. A resin sealer coat and resin ground coat of a preselected color are applied to the embossed face. A pattern or design may be printed with resin inks of different colors on the ground coat. A preferably transparent resin top coat is applied over the inks and the ground coat to protect the embossed face and provide a glossy appearance.

32 Claims, 4 Drawing Figures

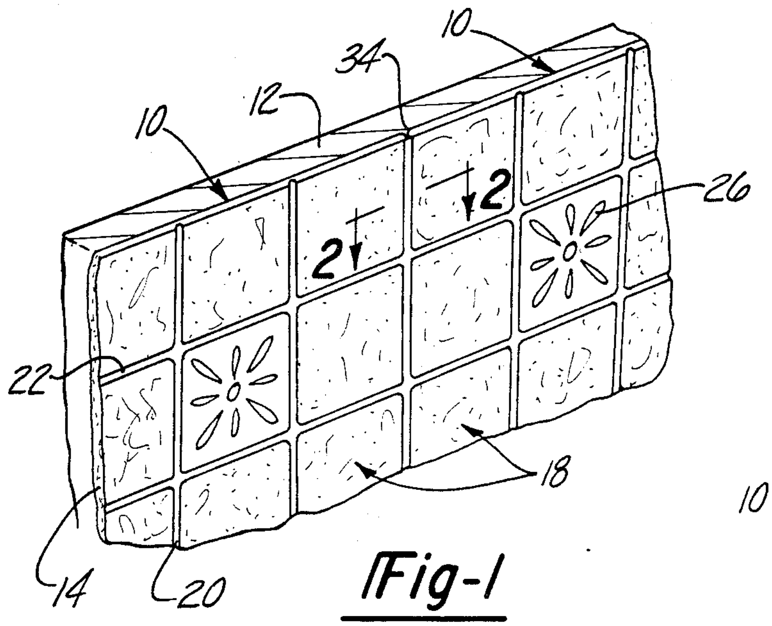
Fig-1
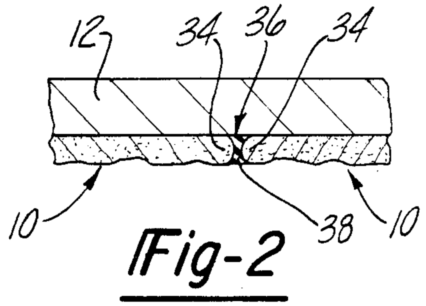
Fig-2
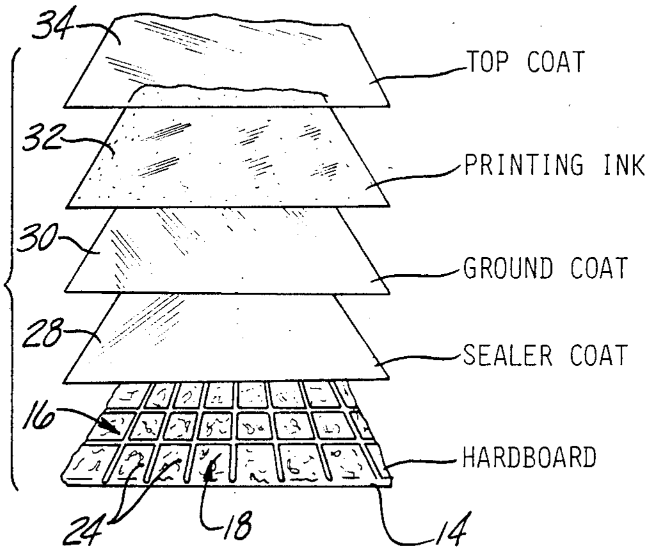
Fig-3
Fig-4
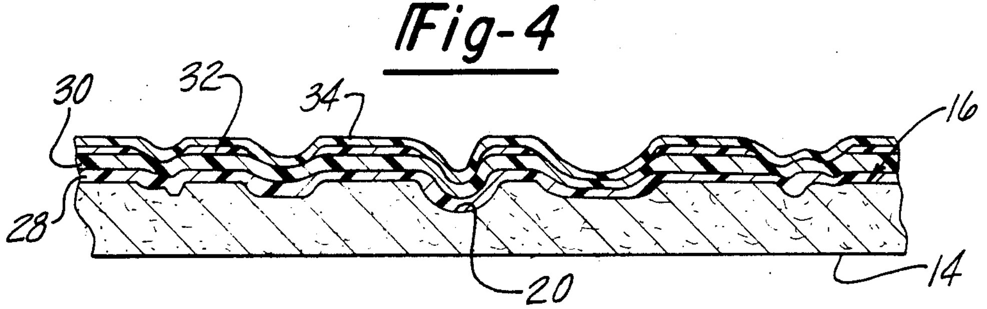

SIMULATED CERAMIC TILE

This is a continuation of copending application Ser. No. 527,695 filed on Aug. 30, 1983, now abandoned.

FIELD OF THE INVENTION

This invention relates to decorative ceramic tiles and more particularly to pressed panels simulating ceramic tiles and a method of making simulated ceramic tiles.

BACKGROUND OF THE INVENTION

Panels simulating tile have been produced from fiberboard or hardboard having a plane flat face. To define the periphery of individual tiles and simulate grout lines, grooves have been cut in a generally rectangular grid in the plane face of the hardboard. Typically, the grooves are covered with a black or other dark coating and the remainder of the face is covered with a white or other light colored coating.

As disclosed in U.S. Pat. No. 4,169,907 panels simulating ceramic tile have also been produced from hardboard by applying colored inks and a resin coating on a plane flat face of the hardboard. The grout lines and any desired decorative pattern in the individual tiles is printed with ink of a desired color containing an organic silicone oil on the flat face of the hardboard. A liquid resinous top coating of another color is applied over the dried ink and the silicone oil is allowed to repel the liquid to form ridges of the liquid coating adjacent the printed pattern before the coating is dried or cured. After the coating is cured, it has an uneven thickness with hills, valleys, and plains which provides variations in the coloring of the top coating and makes the grout lines and printed pattern clearly visible through the top coating.

BRIEF SUMMARY OF THE INVENTION

In accordance with this invention, a simulated ceramic tile is produced by embossing the face of a pressed panel preferably of fiberboard or hardboard. Preferably both grooves simulating grout lines and a decorative three dimensional surface on the face of each tile is embossed in the hardboard panel. To facilitate application of coatings and increase its durability, a sealer or primer of a suitable resin is applied to the embossed face of the hardboard panel. Typically, the sealer is applied in liquid form by roller coating or spraying and is cured at an elevated temperature by baking in an oven.

To provide the desired color of the grooves to simulate grout lines and preferably to provide a base color for the deepest portions of the embossed face of the tile a ground coat of a resin containing a pigment providing the desired color is applied over the embossed face of the panel. Preferably, the ground coat is applied in liquid form by curtain coating or spraying and is cured at an elevated temperature. To assure that all portions of the embossed face are of a substantially uniform color after applying only one layer of the ground coat, preferably a pigment is also added to the primer so that it is the same color as the ground coat.

To provide the desired decorative colors, designs and patterns and improved simulation of real ceramic tile, inks of various colors are applied over portions of the ground coat. To prevent the inks from being applied to the grout lines and the deepest portions of the embossed face they are preferably applied by resilient print rolls.

The inks may be applied to the ground coat by multistage offset printing with resilient print rolls.

To protect the embossed face of the panel and provide a high gloss and texture simulating ceramic tile, a top coat of a preferably clear or transparent resin is applied to the embossed face. Preferably, the top coat is applied in liquid form by spraying or curtain coating and is cured to an elevated temperature to provide a continuous film. Preferably, after the top coat is cured, the hardboard panel is humidified to increase its moisture content to stabilize and prevent extensive expansion of the panel.

Objects, features and advantages of this invention are to provide a simulated ceramic tile with greatly improved realism and decorative and aesthetic appeal and which is rugged, durable, highly moisture resistant, easily installed and maintained, and of economical manufacture and has a long in service life.

BRIEF DESCRIPTION OF THE DRAWING

These and other objects, features and advantages of this invention will be apparent from a perusal of the following detailed description, appended claims and accompanying drawing in which;

FIG. 1 is a fragmentary perspective view of two adjacent sheets of simulated ceramic tile embodying this invention mounted on a wall of a building;

FIG. 2 is an enlarged sectional view taken generally on line 2—2 of FIG. 1;

FIG. 3 is a fragmentary exploded view of the embossed hardboard and coatings of one of the sheets of FIG. 1; and FIG. 4 is an enlarged fragmentary, sectional and somewhat schematic view of one of the sheets of FIG. 1 showing the coatings adhered to the embossed hardboard.

DETAILED DESCRIPTION

Referring to the drawing, FIG. 1 illustrates two sheets 10 of simulated ceramic tile embodying this invention mounted in side by side relationship of a substrate 12 such as drywall, gypsum board or plaster of a wall of a building (not shown). Typically, the sheets 10 are mounted on the substrate 12 by a suitable adhesive.

In accordance with this invention, each sheet 10 has a pressed panel 14 with an embossed decorative face 16 preferably with a plurality of generally rectangular tile sections 18 thereon. The perimeter of each tile section and simulated lines of grout between the tile sections are defined by a plurality of generally longitudinally and laterally extending grooves 20 and 22 embossed in a grid pattern in the decorative face of the panel. Preferably, a three dimensional textured surface 24 and/or a decorative design 6 is also embossed in the face of the tile sections 18. Preferably, at least portions of the grooves, textured face, and designs are embossed to a depth of at least ¼ of the nominal thickness of the panel. When the panel has a thickness of ⅛ of an inch portions of the grooves, textured surface and designs may be embossed to a depth of about ⅓ and occasionally as much as ½ of the nominal thickness of the panel.

In accordance with this invention and as shown in FIGS. 3 and 4, to produce the finished simulated ceramic tile 10, a plurality of coats of resins are applied to the embossed face of the panel 14. Preferably, a sealer coat 28 and a ground coat 30 are applied to the embossed face. Preferably, inks 32 of various colors are printed on only portions of the ground coat. A top coat 34 is applied over the inks and the ground coat.

In panels having a grid of grooves 20 and 22 simulating grout the location of the grooves and the size of the individual tile sections 18 is selected in relation to the length and width of the panel so that essentially a whole number of tile sections will be disposed along each edge of the panel. This positions a portion of a groove essentially along the periphery or edges 34 of the panel so that when adjacent panels are placed in side by side relationship as shown in FIG. 1, the layout of adjacent tile sections will be essentially aligned and symmetrical with each other.

As shown in FIG. 2, preferably the edges of each panel are generally rounded or provided with a bull nose contour. When installed on a wall, preferably a slight gap 36 is provided between adjacent edges so that when filled with a suitable caulking compound 38 the joint between adjacent edges appears to be simply another grout line between adjacent tile. If the color of the caulking compound is identical to the color of the other grout lines of the sheets 10, the joint between adjacent sheets is undetectable to most observers of the installed sheets. Preferably, the caulking compound is moisture impervious such as a silicone rubber caulking compound.

The pressed panel 14 may be of plastic, plywood, particle board, fiberboard or hardboard, and the like. Preferably, the panel 14 is pressed hardboard of wood or lignocellulose fibers which may be made by conventional wet or dry processes. The hardboard panel has a density which is usually in the range of about 50 to 75 lbs. per cubic foot and preferably in the range of about 60 to 65 lbs. per cubic foot.

Typically, a caul or embossing plate is used to form the grooves 20, 22, textured surface 24 and designs 26 when pressing a fiber mat to make the raw hardboard panel. To toughen and harden the raw hardboard, a coat of a thermosetting and/or oxidizable resin or oil is applied and then cured by baking the hardboard at a temperature of about 250° F. to 320° F. for about two to four hours. This cures the oils and makes the hardboard more durable, harder, and moisture resistant.

To minimize warping and stabilize the dimensions of the embossed and baked hardboard panel, its moisture content is raised to a suitable level which typically is in the range of 2% to 8% and usually around 3% to 4% by weight. Usually, the moisture content of the panel is raised by passing it through a humidifier. Preferably, the pressed hardboard panel is made by the method disclosed in U.S. Pat. No. 4,038,131. Since various methods of making satisfactory hardboard panels are well-known to skilled persons they will not be described herein in further detail.

After humdification the periphery of the hardboard panel is trimmed or sized to be compatible with the design of the grid of the grooves 20 and 22, the desired size of the panel, and any requirements for further processing of the panels. Typically, the length and width of a rectangular 4×8 foot hardboard panel are trimmed to within plus or minus ⅛ of an inch. If registration of ink patterns is needed for printing, the panel is typically trimmed to within plus or minus 1/16 of an inch.

To seal and improve the durability of the embossed face of the panel, the primer or sealer coat 28 is applied to the embossed face. Preferably, the sealer 28 is an alkyd, acrylic, melamine, latex or similar thermoplastic or thermosetting resin which can be either water or solvent based. To facilitate hiding or covering up the color of the embossed face of the panel with a minimum thickness of the ground coat 30, preferably the sealer coat 28 contains sufficient pigment to make it the same color as the ground coat.

A suitable sealer 28 of alkyd and melamine resins and pigments making it white in color is commercially available from Mobile Chemical Company, Kamkakee Plant, 901 N. Greenwood Avenue, Kamkakee, Ill. 60901 as Sealer Filler Code No. 522-W-5526. The composition of weight of this sealer is believed to be as follows:

| Constituent | % by Weight of the Total Composition |
|---|---|
| Safflower Oil | 4.8 |
| Phthalic anhydride | 8.2 |
| Rosin | 0.9 |
| Glycerin | 3.5 |
| Coconut Oil | 1.0 |
| Clay (pigment) | 33.0 |
| Barium Sulfate (pigment) | 7.3 |
| Titanium Dioxide (pigment) | 2.6 |
| Driers | 1.0 |
| Dimethyl ethyl amine (stabilizer) | 0.1 |
| Xylol | 37.6 |

The driers are commercially available from Tenneco Chemicals, Inc., 5366 N. Elston Avenue, Chicago, Ill. under the following tradenames:

| Tradename | % by Weight of Total Sealer Composition |
|---|---|
| Nuodex cobalt 254 (21% CO) | 0.2 |
| Tenneco nuextra zinc (18% Zn) | 0.3 |
| Tenneco nuextra manganese (97% Mn) | 0.3 |
| Tenneco nuextra calcium (6% CA) | 0.2 |

The sealer 28 can be applied as a liquid by spraying or rolling it on the embossed face of the hardboard. Preferably the sealer is applied by using a reverse roll coater having a pile fabric covering on the applicator roll. The pile fabric cover ensures the sealer coat is applied to the deepest portions of the embossed face without an excessive amount of liquid sealer flowing into the deepest portions. For application by a reverse roll coater, this sealer is reduced to an operating viscosity in the range of about 12 to 24 seconds and preferably 16 to 20 seconds in a Sears cup by the addition of a suitable solvent such as xylene or xylol.

Sufficient sealer is applied to the hardboard so that the sealer has a nominal thickness when wet of about 0.7 to 1.6 mils so that when dry it has a nominal thickness of about 0.2 to 1.0 mils and preferably about 0.4 to 0.8 mils. Preferably the sealer is dried or cured at an elevated temperature. The sealer can be cured by passing the hardboard through a high velocity hot air oven so that the sealer coat is raised to a temperature in the range of about 180° F. to 260° F. and preferably about 200° F. to 240° F. Typically, this sealer coat temperature is achieved if the air in the oven is at a temperature of about 300° F. to 550° F. and preferably about 475° F. to 525° F. and the hardboard is in the oven for about 20 to 40 seconds and preferably about 25 to 35 seconds.

To provide the desired color of the grooves simulating grout and usually also the deepest portions of the textured face and designs of the tile sections, the ground coat 30 of the desired base color is applied over the sealer coat. This ground coat also provides an appropriate surface for receiving the decorative inks 32 and adhering the top coat 34 to the embossed face. Suitable ground coats are alkyd, acrylic, lacquer, melamine, latex and like thermosetting and thermoplastic resins.

A suitable ground coat of alkyd and melamine resins and pigments making it white in color is commercially available from Mobile Chemical Company as Ground Coat Code No. 527-W-5545. The composition by weight of this ground coat is believed to be as follows:

| Constituent | % by Weight of the Total Composition |
|---|---|
| Safflower Oil | 1.7 |
| Phthalic anhydride | 4.8 |
| Rosin | 0.3 |
| Glycerin | 2.2 |
| Coconut Oil | 1.6 |
| Isobutylated melamine formaldehyde | 3.0 |
| Clay (pigment) | 26.8 |
| Titanium dioxide (pigment) | 21.4 |
| Calcium carbonate (pigment) | 5.4 |
| Driers | 1.0 |
| Triethyl Amine (stabilizer) | 0.1 |
| Xylene | 26.6 |
| Normal butyl alcohol | 5.1 |

The driers are commercially available from Tenneco Chemicals, Inc., under the following tradenames:

| Tradename | % by Weight of Total Ground Coat Composition |
|---|---|
| Nuodex cobalt 254 (21% CO) | 0.2 |
| Tenneco nuextra zinc (18% Zn) | 0.3 |
| Tenneco nuextra manganese (97% Mn) | 0.3 |
| Tenneco nuextra calcium (6% CA) | 0.2 |

The ground coat can be applied by spraying or preferably curtain coating. If the ground coat is applied by curtain coating, it is typically thinned to a viscosity of about 20 to 40 seconds, preferably about 25 to 35 seconds, and desirably about 30 seconds in a Sears cup with a solvent such as xylol or xylene.

Preferably, sufficient ground coat is applied so that when wet it has a nominal thickness in the range of about 1.5 to 3.5 mils and preferably about 2.0 to 3.0 mils so that when dry or cured the ground coat has a nominal thickness in the range of about 0.7 to 1.8 mils and preferably about 1.0 to 1.5 mils.

To prevent excessive flow of wet ground coat into the deepest portions of the embossed face, which tends to fill the deepest portions and to cause blistering of the ground coat when drying, the embossed face of the hardboard panel is preferably at an elevated temperature in the range of about 90° F. to 130° F. and preferably about 100° F. to 120° F. when the ground coat is applied. If the sealer and ground coats are applied in a continuous coating line the panel may already be at this elevated temperature from passing through the sealer drying oven. If not, the panel can be preheated to this temperature before applying the ground coat.

The wet ground coat is dried and cured by raising it to a temperature of about 180° F. to 260° F. and preferably about 200° F. to 240° F. Preferably, the wet ground coat is dried in a high velocity hot air oven for about 20 to 40 seconds and preferably about 25 to 35 seconds operating with an air temperature of about 300° F. to 550° F. and preferably about 450° F. to 550° F.

To ensure a substantially uniform color is obtained over the entire embossed face after the ground coat has been applied and dried while minimizing the thickness of the ground coat to avoid blistering and excessive filling of the deepest portions of the embossed face, it is preferable that the sealer be tinted with pigment to the same color as the ground coat. This provides an embossed face with a substantially uniform color even if the deepest portions are not completely covered with the ground coat. This also eliminates the need to apply a second ground coat to ensure that the embossed face is of essentially uniform color throughout.

Preferably, although not necessarily, to more closely simulate the appearance of real ceramic tile, decorative prints or patterns of ink of one or more colors differing from the color of the ground coat are applied to portions of only the tile sections 18 of the panel. Lacquer, nitrocellulose, alkyd, latex and like resin based inks can be used for decorative printing. Suitable commercially available inks in a variety of colors are available from Mobile Chemical Company of Kankakee, Ill. under the name "Printer Ink." These inks are believed to be about 95 parts alkyd resin and 5 parts pigmentation by weight reduced in butyl acetate to a viscosity of about 30 to 40 seconds in a Sears cup. To obtain the desired intensity or appearance of these inks when printed on the ground coat it is usually necessary to further reduce these inks about 30% to 70% by volume depending on the printing equipment and operating conditions.

The ink can be applied to the ground coat by silk screen or preferably offset printing. To achieve a desirable appearance the ink should not be applied in the grooves simulating the grout and the deepest portions of the embossed areas 24 and designs 26 of the tile sections 18. This can be achieved by using a somewhat resilient printing roll which is hard enough to prevent the ink from being deposited in the grooves and the deepest portions of the embossed face of the tile sections and yet is soft enough to ensure that the ink is applied to the upper portions of the embossed face of the tile sections without missing or skipping portions of these areas. A print roll of urethane having a durometer of about 34 to 46, desirably about 38 to 42 and preferably about 40 has proved to be satisfactory.

With many decorative prints, designs, and patterns registration of the various colors of ink with each other and/or with the hardboard panel is unnecessary although with some patterns or designs it may be desirable or even necessary. After printing, it may be necessary to dry some inks at an elevated temperature although the alkyd inks of Mobile Chemical dry quickly under ambient temperature conditions.

To provide a high gloss and texture very similar to that of real ceramic tile, the top coat 34 is applied over the dry printing inks 32 and the ground coat 30. In most applications the top coat must also protect the decorative face of the finished panel 10 from contact with water and absorption of moisture. Suitable top coatings for this purpose are acrylic, polyester, epoxy and vapor phase cured resins. Preferably, the top coat is clear or transparent although it can be tinted if desired.

Suitable top coat resins are commercially available from the Spencer Kellog Division of Textron, Inc., 120 Delaware Avenue, Box 807, Buffalo, N.Y. 14220 under the tradename Aroflint. This is a clear or transparent two part polyester epoxy resin system of Aroflint No. 607 and Aroflint No. 404 resins. Aroflint No. 607 is believed to be a polyester resin and Aroflint No. 404 is believed to be a oxirane modified ester resin. A suitable top coat composition by volume of these resins with solvents and a slip agent is as follows:

| Constituent | % by Volume of the Total Composition |
|---|---|
| Aroflint 607 | 34.0 |
| Slip Agent | 4.8 |
| Xylene | 6.2 |
| Cellosolve Acetate | 5.0 |
| Aroflint 404 | 50.0 |

The slip agent is a polyethylene dispersion commercially available under the tradename SL-50 from Daniels Products Company Division of Synres Chemical Corporation, 400 Claremont Avenue, Jersey City, N.J. 07304. This slip agent increases the fluidity of the liquid top coat composition, enhances the smoothness, slickness, feel and appearance of the cured topcoat to more closely simulated real ceramic tile and prevents the cured topcoat from sticking to the back face of another hardboard panel when the panels are stacked together.

Once the Aroflint resins are mixed together, this top coat composition has a limited pot life of about three to six hours, depending on the temperature of the composition, due to cross linking of the resins. Thus, these resins should be mixed together in limited quantities and the top coat applied shortly after the composition is mixed.

The top coat 34 can be applied to provide a continuous film without excessive thickness by a device which does not contact the hardboard such as a sprayer or preferably a curtain coater. To ensure a continuous film of top coat and avoid any skips or misses at the leading edges of the deepest portions of the embossed areas the curtain of liquid coating should be very elastic, the curtain coater should have a specific construction and arrangement to produce a relatively thin and very elastic and flexible curtain of liquid coating, and the hardboard panel should pass under the slit of the curtain coater at a relatively slow speed. When applying the Aroflint resin coating with a curtain coater, a satisfactory viscosity is usually about 32 to 40 seconds, desirably about 34 to 38 seconds and preferably 36 seconds in a Sears cup.

The slit opening of the curtain coater has a width in the range of about 0.025 to 0.030 of an inch and preferably about 0.027 to 0.028 of an inch. Preferably the slit is positioned above the hardboard panel at about 8½ inches to 12 inches, desirably about 9 to 11 inches, and preferably about 10 inches. Preferably the head or level of the resin above the slit opening in the coater is about 7 to 9½ inches, desirably about 7½ to 9 inches and preferably about 8 to 8½ inches.

Preferably, sufficient top coat is applied so that when wet it has a thickness about 2 to 4 mils so that when dry and cured the top coat has a nominal thickness of about 1 to 2 mils and preferably about 1.0 to 1.5 mils. To prevent an excessive amount of wet top coat from flowing into the deepest portions of the embossed face, desirably the embossed face is at a temperature of about 90° F. to 150° F. and preferably about 110° F. to 130° F. when the top coat is applied. In a continuous manufacturing operation the top coat is usually at this temperature because of the heat retained from passing through the ground coat oven. If needed, the embossed face can be heated to this temperature by passing the panel through a suitable oven, bank of infared heaters, or the like just prior to applying the top coat.

The wet top coat is dried and cured by heating it to a temperature of about 300° F. to 330° F. for about 45 to 90 seconds to evaporate the solvents and cross link the resins. Cross linking of the resins can be accelerated by using infared heat. To avoid blistering of the top coat it is preferably heated in at least two and preferably three zones or increments. Preferably the top coat is dried and cured by passing the panel through a high velocity hot air oven with three zones having hot air temperatures of about 280° F., 320° F. and 350° F. respectively for about 50 to 60 seconds and then through infared heaters for about 30 to 35 seconds. Typically the top coat enters the oven at a temperature of 110° F. to 120° F., leaves the oven at 240° F. to 270° F., and leaves the infared heaters at 300° F. to 330° F.

When initially dried the top coat is usually somewhat soft and hence preferably the finished panels are cooled prior to being stacked on top of each other to prevent them from sticking together. Preferably the finished panels are cooled to a temperature of not more than 120° F. before stacking by blowing a stream of air at ambient temperature on the embossed face of the panels.

To provide dimensional stability and prevent warping of the panels due to absorption of moisture from the air, the panels are humidified so they have a moisture content of at least 2½% and preferably 3% to 4%. The panels may be humidified by spraying water on one or both faces of the panels. After humidification the finished panels are usually wrapped and stacked for shipping.

We claim:

1. A simulated ceramic tile panel comprising, a pressed panel having a density of at least about 50 pounds per cubic foot and a decorative face having a three dimensional embossed area of said panel with the deepest portions having a depth of at least about ¼ of the nominal thickness of said panel, grooves in said embossed area in said decorative face simulating grout lines between adjacent tile portions of said decorative face, a ground coat of resin on said decorative face and applied over said grooves and said embossed area only after they have been formed in said panel, having a nominal dry film thickness in the range of about 0.5 to 2.5 mils and a pigment of a first color therein; an ink of at least one second color applied over only portions of said ground coat after it is a dry film such that essentially no ink is on the ground coat in at least the deepest portions of the embossed area of the decorative face, said second color differing from said first color and said ink not coloring and not simulating grout lines between adjacent tile portions of said decorative face; and at least one top coat of a continuous film of a transparent resin applied over said ground coat and said ink after said ground coat is dry, adhering to said ground coat, and when dry having essentially the same thickness throughout and having a nominal dry film thickness in the range of about 0.5 to 2.5 mils.

2. The tile panel of claim 1 which comprises inks of at least two different colors on only portions of said ground coat such that essentially no ink is in at least the deepest portions of the embossed area of the decorative face.

3. The tile panel of claim 1 wherein said pressed panel comprises pressed fiberboard and said grooves are embossed in said panel.

4. The tile panel of claim 1 wherein said pressed panel comprises pressed fiberboard which is embossed during formation of the pressed fiberboard.

5. The tile panel of claim 1 wherein said pressed panel comprises pressed fiberboard having a moisture content of at least about 3% by weight.

6. The tile panel of claim 1 wherein said pressed panel comprise a pressed fiberboard and a sealer of a resin on said decorative face of said pressed panel underlying said ground coat and having a nominal thickness in the range of about 0.2 to 1.5 mils and a pigment producing a color of said sealer which is substantially the same as said first color of said ground coat.

7. The tile panel of claim 1 wherein said embossed area comprises a plurality of grooves extending longitudinally across said decorative face and being laterally spaced apart and a plurality of grooves each extending laterally across said decorative face and being longitudinally spaced apart such that said grooves simulate grout lines between adjacent tiles.

8. The tile panel of claim 7 wherein at least a portion of one of said grooves extends along each edge of said panel.

9. The tile panel of claim 7 wherein said grooves at least in part define the periphery of a plurality of individual tile sections and at least some of said tile sections have an embossed area wholly within the periphery.

10. A simulated ceramic tile panel made by the process comprising, embossing a decorative face of a panel having a density of at least about 50 pounds per cubic foot so that at least the deepest portions of the embossed face have a depth of at least $\frac{1}{4}$ of the nominal thickness of the pressed panel, forming grooves in said embossed area of said decorative face simulating grout lines between adjacent tile portions of said decorative face, after embossing applying a liquid ground coat of a resin composition with a pigment of a first color therein over the decorative face of the panel including the grooves and the embossed portions, curing the resin to provide a solid ground coat having a nominal dry film thickness in the range of about 0.5 to 2.5 mils, applying ink of at least one second color differing from said first color on only portions of said ground coat after it is cured such that essentially no ink is on the ground coat in the deepest portions of the embossed face, applying at least one liquid top coat of a transparent resin on the cured ground coat and the ink without contacting the ground coat or the ink with the applicator of the top coat, and curing the liquid top coat to form an essentially continuous, solid and transparent resin film of top coat adhered to the ground coat, having essentially the same thickness throughout and having a dry film nominal thickness in the range of about 0.5 to 2.5 mils.

11. The tile panel of claim 10 wherein said sealer coating comprises a pigment providing a color of said sealer coating which is substantially the same as the color of said ground coat.

12. The tile panel of claim 10 wherein said ink is lacquer, nitrocellulose, alkyd or water based.

13. The tile panel of claim 10 which comprises applying said inks with a print roller of a resin having a hardness in the range of 35 to 45 durometers.

14. The tile panel of claim 10 which comprises preheating the decorative face of said panel to a temperature in the range of 100° F. to 140° F. prior to applying said liquid top coat.

15. The tile panel of claim 10 wherein said liquid top coat has a viscosity in the range of about 30 to 40 seconds in a Sears cup and is applied with a curtain coater having a slit opening in the range of about 0.020 to 0.038 of an inch positioned about 8 to 12 inches above the decorative face of said pressed panel and having a head of about 7 to 9 inches of liquid top coating.

16. The tile panel of claim 15 which comprises passing the panel under said slit opening of said curtain coater when applying said liquid top coat at a speed in the range of about 375 to 425 lineal feet per minute.

17. The tile panel of claim 10 which comprises forming said pressed panel of pressed fibers and applying a liquid coating of a sealer resin on the decorative face of said fiberboard panel and curing said sealer coating to provide a film having a nominal thickness in the range of 0.2 to 1.5 mils before applying the liquid ground coat.

18. The tile panel of claim 17 wherein the sealer coating comprises a resin selected from the group of alkyd, acrylic, melamine and latex resins.

19. The tile panel of claim 17 which comprises curing said liquid sealer coating by elevating the temperature of the decorative face of said pressed panel to a temperature in the range of 180° F. to 260° F.

20.

The tile panel of claim 1 wherein said ground coat comprises a resin selected from alkyd acrylic or latex resins.

21. The tile panel of claim 20 which comprises curing said liquid ground coat by elevating the temperature of the decorative face of said pressed panel to about 180° F. to 260° F.

22. The tile panel of claim 20 which comprises preheating the decorative face of said pressed panel to a temperature in the range of about 90° F. to 130° F. prior to applying the liquid ground coat.

23. The tile panel of claim 20 which comprises applying said inks with a print roller of a resin having a hardness in the range of 35 to 45 durometer.

24. The tile panel of claim 23 which comprises applying said inks with a print roller of a foamed urethane resin having a hardness in the range of 35 to 45 durometer.

25. The tile panel of claim 10 wherein said top coat comprises resin selected from acrylic, epoxy, or vapor phase cured resins.

26. The tile panel of claim 25 which comprises cooling said panel after curing said top coat and before stacking said panel so that the temperature of said decorative face is not greater than about 120° F.

27. The tile panel of claim 25 which comprises preheating the decorative face of said pressed panel to a temperature in the range of 100° F. to 140° F. prior to applying said liquid top coat.

28. The tile panel of claim 25 wherein said liquid top coat has a viscosity in the range of about 30 to 40 seconds in a Sears cup and is applied with a curtain coater having a slit opening in the range of about 0.020 to 0.038 of an inch positioned about 8 to 12 inches above the decorative face of said panel and having a head of about 7 to 9 inches of liquid top coating.

29. The tile panel of claim 28 which comprises passing the panel under said slit opening of said curtain coater when applying said liquid top coat at a speed in the range of about 375 to 425 lineal feet per minute.

30. The tile panel of claim 25 which comprises heating the decorative face of said panel to a temperature in the range of about 260° F. to 370° F. after applying said liquid top coat to cure said top coat.

31. The tile panel of claim 30 which comprises pre-heating the decorative face of said panel to a temperature in the range of 100° F. to 140° F. prior to applying said liquid top coat.

32. The tile panel of claim 30 wherein said pressed panel is heated to an elevated temperature to cure said top coat in a plurality discreet increments of increasing temperature.

* * * * *